Jan. 17, 1967 AN WANG ETAL 3,299,408

DATA TRANSLATION SYSTEM

Filed Aug. 27, 1963 4 Sheets-Sheet 1

Jan. 17, 1967 AN WANG ETAL 3,299,408

DATA TRANSLATION SYSTEM

Filed Aug. 27, 1963 4 Sheets-Sheet 2

United States Patent Office 3,299,408
Patented Jan. 17, 1967

3,299,408
DATA TRANSLATION SYSTEM

An Wang and Ge-Yao Chu, Lincoln, Mass., assignors to Wang Laboratories Inc., East Natick, Mass., a corporation of Massachusetts Filed Aug. 27, 1963, Ser. No. 304,804
25 Claims. (Cl. 340—172.5)

This invention relates to data processing systems and more particularly to serial data translation systems.

In the processing of data items it is frequently desired to translate those items from one coded inter-relationship to another. Such an application for data translation equipment arises where it is desired to insert justification information in textual data for the control of line casting machines to produce type arranged in lines of correct length. The input for such equipment is in the form of coded data which typically represents characters, spaces and typographical operations formed into words, sentences and paragraphs. Such coded input data may, in addition, include justification information which it is desired to revise. In the generation of justification information both the type face to be employed and the desired length of line must be taken into consideration.

In inserting justification information, it is on occasion necessary to hyphenate words in order to maximize the use of the available line space, and due to the many possible character combinations, storage capacity of the size employed in general purpose computers would be required in translation equipment capable of automatically selecting a point at which various letter combinations can be acceptably hyphenated. Many other data translation operations involve similar translation decisions that require large storage capacity for exclusively machine controlled translation.

Accordingly, it is an object of this invention to provide novel and improved data translation equipment particularly adapted to insert justification information into coded data for use in controlling line casting machines.

A more general object of the invention is to provide novel and improved data translation apparatus for translating serially presented data items.

A further object of the invention is to provide novel and improved data translation apparatus enabling manual intervention in the data translation operation where a judgment beyond the capabilities of the translation apparatus is required.

A further object of the invention is to provide novel and improved data translation equipment which provides coordination between the data translating units and associated display equipment employed for manual intervention in the translation operation.

The preferred embodiment of data translation systems constructed in accordance with the invention serially translates coded textual data to incorporate justification information in that data. The text data to be "justified" is encoded on a tape in a six channel Teletype code and includes capitalization information, punctuation, etc. in addition to text characters. It also may include "justification" information such as "End of Line" codes that are to be revised, or error codes that are to be deleted. This data is screened, and the weight of those coded items that affect line length are accumulated. Each character will occupy a determinable portion of line length as a function both of the nature of the type font to be employed and the character itself. For example, a lower case "i" will require a relatively short line length, a lower case "n" a greater line length, and an upper case "M" a still greater line length in a conventional type style, but these lengths will vary from style to style. This "weight" information is operatively connected in the translation apparatus by one of a group of pluggable memory units, each memory unit being characteristic of a particular line length weighting for a particular type font. A tape reading unit provides output signals as a function of the coded data and, after preliminary code modification, serially applies signals representative of text characters to a storage device. A decoder serially senses the stored character signals and through justification logic circuitry gates a weight factor from the memory unit according to the nature of the sensed character to a weight accumulator unit preset to a desired line length. As the number of characters disposed in line by line casting equipment typically can be adjusted through selection of interword spacings, the accumulator accords several differing weights in response to each decoded interword. A full line signal is generated for each of several differing numbers of characters as a function of the differing interword weights. When the maximum number of characters capable of being placed on a line have been decoded, the justification logic automatically initiates a search to determine whether a text word ends within a permissible range from the last character, and if so, coded justification characters which provide line casting machine control are inserted in the serial data train without interruption of the serial translation operation.

However, should the translating apparatus not locate an interword within the permissible range, it automatically interrupts the serial text sensing operation and enables manual intervention circuitry which permits an operator to insert the justification control information. Typically, this intervention requires the selection of an appropriate hyphenation point, and to this end the manual intervention circuitry provides a display of the entire word of text which was being decoded when the "overset" point was sensed by the weight accumulator. Correlated with this word display are manual intervention controls whereby an operator may select either an interword location or a hyphen location as a function of the displayed information. This display is controlled from the serial text storage element through the same decoder that controlled the gating of weight information to the accumulator circuitry, and the manual intervention controls operate justification logic that they share with the automatic search controls.

The appearance of this display signals the monitoring operator that the translating apparatus has encountered a situation which it is not capable of handling, and all the pertinent information necessary for an operator decision is displayed in front of him. Through selection of one of several possible alternatives as a function of the display the operator can cause the apparatus to enter justification control information in the serial data train. A feedback link is provided which alerts the operator if the selected decision does not meet pre-established criteria and prevents the insertion of the selected control information together with means to over-ride this link if necessary. When an acceptable decision has been made by the operator, the system disables the manual intervention apparatus and automatically resumes the data translation operation to insert justification control data in the serial text train at the specified point.

While the data translation apparatus of the invention has particular utility in generating justification information for use in the control of line casting machines, its use is not limited to such applications, and further objects, features and advantages of the invention will be seen as the following detailed description of an embodiment thereof progresses, in conjunction with the drawings, in which.

Figures 1, 2:
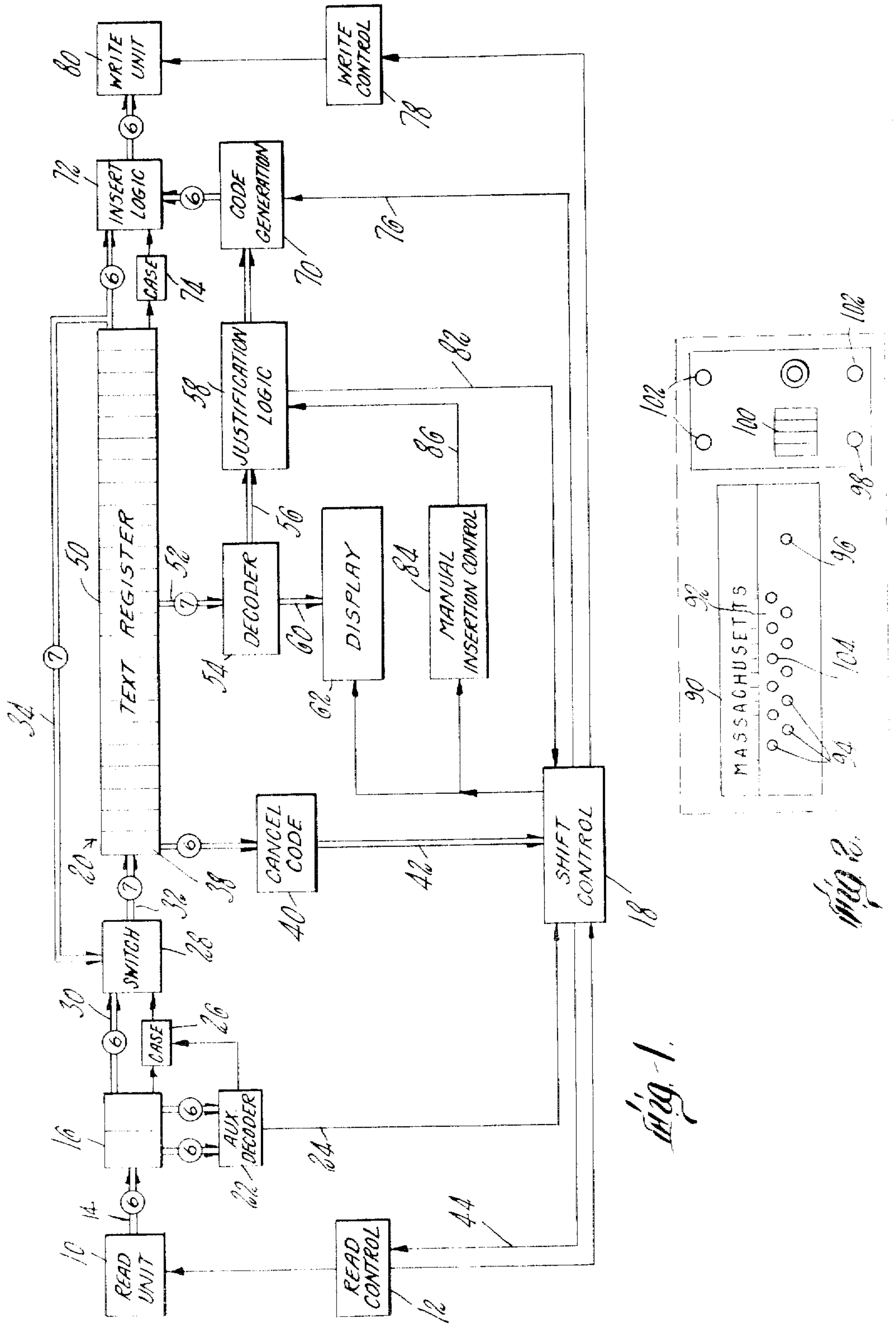
FIG. 1 is a block diagram of data translating apparatus constructed in accordance with the invention for converting coded data recorded on perforated tape representative of textual information into modified coded data that includes justification information for use in the control of line casting machines.
FIG. 2 is a view of the display and control associated with the manual intervention console employed with the apparatus of FIG. 1.

The system shown in FIG. 1 includes a source of data signals in the form of tape reader 10 under the control of a read control unit 12. In the illustrated embodiment of the invention this tape reader is adapted to read a six channel tape punched in accordance with a Teletype code. The generated signals are applied over cable 14 to a two stage character register 16. The tape reader 10 produces six bit character signals at the rate of approximately one hundred per second and this rate controls basic system shifting speeds via the shift control unit 18, whereby the signals are shifted through unit 16 and the text register 20 at that rate.

The auxiliary character register 16 is employed to delete or revise characters in the input signal train as necessary prior to application to the text register for weight accumulation operations. For example, a delete code may be sensed by the auxiliary decoder 22 and that code is deleted simply by sending a signal over the line 24 to the shift control unit 18 to effect the shift of that code out of register 16, but block its insertion into text register 20 (text register shift inhibited). Where the input text information includes justification information for example which is to be revised, it is necessary to delete such information as an end of line character, and any hyphen that precedes an end of line character. For this purpose, whenever an end of line character is sensed, a signal sent over line 24 inhibits the text register shift for one character and whenever a hyphen precedes an end of line character, both characters are deleted by inhibiting two text register shift pulses.

Another revision is necessary to delete the separate case control characters ("upper case shift" and "lower case shift") as those characters per se should not be decoded in the line length accumulation operation. However, the case information must be retained, both for line casting machine control and to adjust the weight accorded the capitalized characters in the justification logic, and for this purpose there is provided a separate case control circuit 26 which may be a flip-flop for example. The output of the flip-flop is applied to a separate or seventh channel in the switch unit 28 so that this case information is transmitted along with the character information on the other six channels that are applied to the switch 28 from the register 16 over cable 30. (Whenever a change of case is detected the character is deleted by inhibiting the text register shift as above.)

The output of switch 28 is applied over a seven channel cable 32 to the twenty-four stage text shift register 20. A seven channel feedback link 34 couples the output stage 36 of the shift register 20 to the switch unit 28 and this link is connected in circuit both for display control purposes when manual intervention is required and for recount operations so that the register 20 is connected as a ring during those operations. Normally, however, switch unit 28 is connected to transfer the data from cable 30 to the text register 20 via cable 32. This text register is a reversible shift register of conventional type so that its contents may be shifted in either direction, that is, either forward or backward. The first stage 38 of this register has a cancel code detector 40 connected to it, which promptly upon sensing of a cancel code configuration causes the shift control 18 to shift the text register backwards at a ten kilocycle shifting rate to delete characters (by shifting out of register 20) until a second character code is sensed, and then the remaining text register contents are shifted forward until their prior positions are reached. The slower forward shifting under the control of the tape reader need not be interrupted as this high speed shifting operation is approximately one hundred times faster than the tape reader shift.

The twelfth stage 50 of the text register 20 has a seven channel connector 52 coupled to decoder 54. This decoder 54, in response to information signals supplied on cable 52, provides an output signal over unique lines of cable 56 to justification logic circuitry 58. In similar manner, unique lines in cable 60 are energized to control the pattern generator for the display of a character by the unit 62. This display unit may be of the type shown in the Gordon et al. Patent No. 2,920,312 in which a 7 x 9 character dot generation matrix is employed for the display of the character whose representative signals are stored in stage 50 of the text register.

The justification logic 58, as character signals are shifted through the text register 20, accumulates character weight information as a function of line length, and when the number of characters to fill a line of selected length has been determined, the justification logic generates an end of line character (or characters) via code generation circuit 70 and applies that character in synchronism with the data signals in the text register for insertion in the serial train of characters by means of insertion logic 72. As the text signals are shifted out of register 20, the case information level is sensed by case logic 74 similar to the logic 26 to generate a change of case character and restore that character to the serial data train. These operations are synchronized with the operation of the shift control 18 via signals on the line 76, and the write control unit 78 controls the tape punch 80 to store the translated data on punched tape in form suitable for controlling a line casting machine.

In many cases the justification logic can in itself locate a suitable end of line position and generate the character or characters to be inserted in the data train. However, should the justification logic not be able to automatically generate this end of line information, it supplies a manual intervention signal over line 82 to the shift control 18 for interrupting the supply of data by the read unit 10. This manual intervention signal also turns on the display unit 62 and enables the manual insertion control unit 84. Contents of the text register 20 (including at least one character beyond the "overset" point) are visually displayed by the display unit, alerting the operator to the fact that the justification logic is unable to insert end of line information and, by observing the displayed text information, the operator inserts the end of line indication at an appropriate point via a signal over line 86.

The manual intervention console is indicated in FIG. 2 with an illustrative display and associated manual controls. A complete word (or up to twenty-four characters) are displayed on the screen 90 of the display unit. The characters are displayed in reverse order from their disposition thereof located on either side of the "overset" point indicator 92. The manual controls include twelve hyphen insert push buttons 94, an interword push button 96, and a "bell mode" indicator button 98. In addition, the control panel includes a line length selector 100 and miscellaneous other controls generally indicated as elements 102.

In the illustrated display on the control console, the overset point occurred at the second "t" in the word Massachusetts. If the operator wishes to hyphenate the displayed word after the "u," he would depress the push button 104 and the justification logic, in response to the resulting signal from the manual insertion control, would insert an end of line code and hyphen at that point through the code generation circuitry 70 and insertion logic 72. Depression of the push button 96 would place the end of line code information at the interword location (provided that interword was located within a pre-established range). In the illustrated display the interword is located before the "M," and as this location is outside of usual limits (typically established as a function of standard interword spacings), depression of the interword push button 96 would not de-energize the display. In such case the justification logic control (which specifies the established limits) can be over-ridden by means of the bell mode control 98 and depression of the interword button 96 then will cause the line to be ended before the "M." The bell mode button 98 can also be employed where a selected hyphenation is outside the established limits in an over-riding operation, and then the operator can cause the equipment to insert a hyphen at the desired point.

Further details of this circuitry and the coordinated operation of the system will be understood with reference to FIGS. 3–8.

Figures 3, 4:
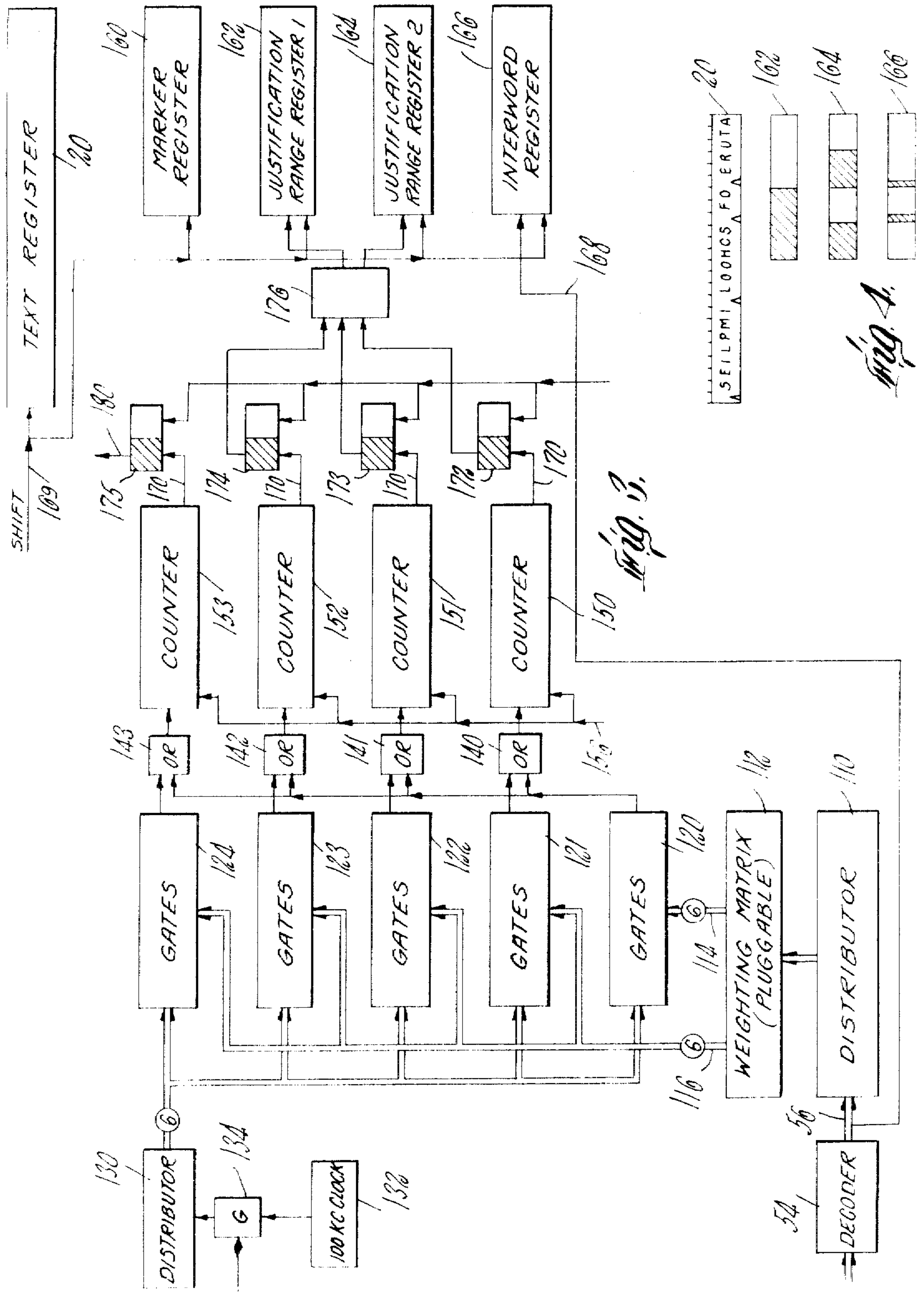
FIG. 3 is a block diagram of the justification logic including character weighting and line weight accumulator units.
FIG. 4 is a diagram of illustrative contents of justification logic registers shown in FIG. 3.

The justification logic is shown in greater detail in FIG. 3. As shown in that figure, a character value signal from decoder 54 is transmitted over one line of cable 56 to distributor 110 for application to a pluggable memory unit in the form of a weighting matrix 112. This weighting matrix assigns a weight to the decoded character signal as a function both of the character (including upper or lower case) and the type font to be employed. Adjustment for different type styles is accomplished merely by substituting one matrix unit for another. The weighting matrix has two sets of output lines, one for standard characters (cable 114) and a second for interword characters (cable 116).

Signals on these output lines condition gate units 120–124, and in the illustrated embodiment each unit includes six gates. A series of sixty-three pulses is applied to each gate unit from distributor 130 to which pulses are supplied at a one hundred kilocycle rate from clock 132 as controlled by gate 134 (which is controlled by the decoder 54 and distributor 130). Depending on the gates in each unit 120–124 that are conditioned by signals over cables 114 and 116, any number of pulses from 0–63 may be applied over the output line from each gate unit.

The series of pulses from main character gate unit 120 are applied through OR circuits 140–143 to step each accumulating counter 150–153 the same amount. (These counters are preset to a line length weight as specified by control 100 by signals over line 156 after each end of line code generation.) In response to each interword character, however, conditioning signals from which are applied over cable 116, each of the gate units 121–124 accords a different weight to this character and gates a differing number of pulses so that the counters 150–153 are stepped differing amounts. The largest weight for an interword, for example an em value, is assigned to the gates 121 and thus stored in the counter 150. Correspondingly smaller weights are assigned to the gates 122 and 123 and stored in corresponding counters 151 and 152 while the smallest permissible weight (minimum space band width for example) is assigned to gate 124 and stored in counter 153.

Also included in the justification logic are a set of four twelve stage shift registers, a marker register 160, two justification range registers 162 and 164 and an interword register 166, that are normally stepped in synchronism, with the text register 20. Each decoded interword generates a signal over line 168 to set the first stage of interword register 166, and this indication is stepped along providing an indication of where interwords are located in the text register 20.

When each counter is stepped to zero, it produces an output pulse on a line 170 to set the corresponding flip-flop 172, 173, 174, 175, and that flip-flop then applies a signal through logic 176 to set the first stage of one or both range registers 162, 164. When counter 150 overflows, a level is supplied to range register 164; when counter 151 overflows, the level to register 164 is removed and a level is applied to range register 162; and when the counter 152 goes to zero, levels are supplied to both range registers 162 and 164. Finally, when the counter 153 is set to zero, flip-flop 175 is set and produces an output signal on line 180 which indicates overset, i.e. that there is not sufficient room in the line for the character currently in stage 50 of the text register 20.

At this point an indication of the locations of all the interwords in the twelve decoded character spaces is stored in the interword register 166 and indications of four line lengths for various interword weights are stored in the range registers 162 and 164. An illustrative example of the contents of these registers is shown in FIG. 4: the fourth and sixth stages of interword register 166 being set as indications of the interwords in the last twelve stages of text register 20; stages 1–3 and 7–9 of register 164 being set; and stages 1–6 of register 162 being set. (It will be understood that the number of stages set in range registers 162, 164 is a function of the number of interwords in the line and the illustration is entirely arbitrary.)

Figure 5:
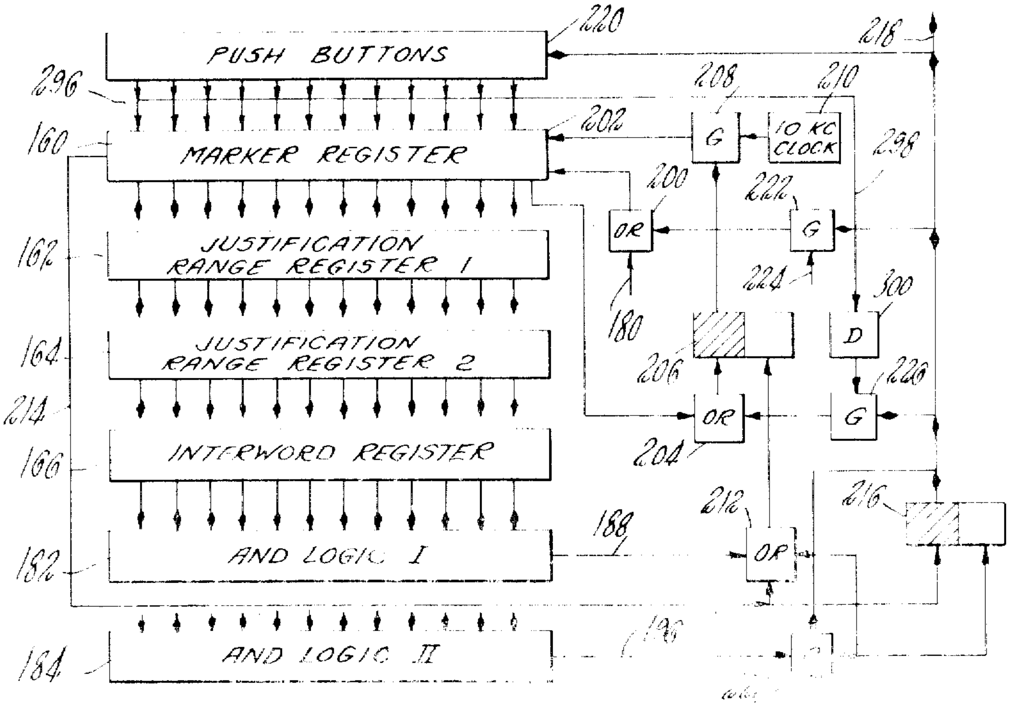
FIG. 5 is a logical block diagram showing features of the automatic justification information signal generating portion of the justification logic.
Figure 6:
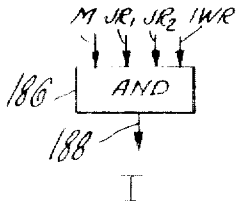
FIGS. 6 and 7 are logical block diagrams of a stage of the AND circuitry employed in the apparatus shown in FIG. 5.
Figure 7:
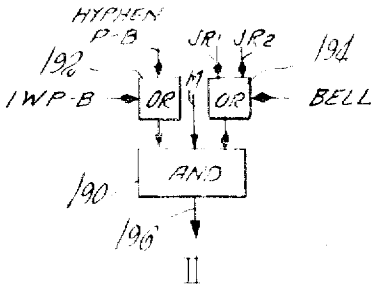

Details of the line end position determining logic are shown in FIG. 5. The registers shown in FIG. 5 are in mirror relation to the showing in FIG. 3. Coupled to the group of registers 160, 162, 164, 166 are two sets of AND logic 182 and 184. These logic units may take several forms, but for illustrative purposes one form for each stage of logic is indicated in FIGS. 6 and 7 respectively. A logic stage of unit 182 as shown in FIG. 6 includes an AND circuit 186 having conditioning inputs from the four registers 160, 162, 164 and 166 and an output line 188. A logic stage for unit 184 includes a three input AND circuit 190 and the OR circuits 192 and 194 and has an output line 196. One input of AND circuit 190 is connected to the corresponding stage of marker register 160 and the other inputs are from the OR circuits. OR circuit 192 has an input from interword push button 96 and another input from the hyphen buttons 94, while OR circuit 194 has inputs from registers 162 and 164, and from the bell mode button 98.

With reference again to FIG. 5, the output signal on line 180 from flip-flop 175 (FIG. 3) is applied through OR circuit 200 to set the first stage 202 of marker register 160. The setting of that stage of the marker register applies a signal through OR circuit 204 to set the automatic search flip-flop 206 and the resulting output level conditions gate 208 to pass pulses from a ten kilocycle clock source 210 to step the marker through that register. (This stepping operation is performed independently of the text or other logic registers.)

AND logic unit 182 will produce an output on line 188 if the corresponding stages of all three registers 162, 164, 166 are set when the marker being stepped through the marker register 160 reaches that stage. This condition can arise only if an interword is located within the smallest justification range.

In such event, a pulse from AND circuit logic unit 182 is applied over line 188 through OR circuit 212 to clear the flip-flop 206. This removes the conditioning level from gate 208 and the marker does not shift further through the marker register 160. As this operation occurs at a much more rapid rate than the shifting produced by the read control unit 12 (the shifting rate is approximately one hundred times faster) the text shifting operation need not be interrupted. The marker, as positioned, is then shifted with the text and logic and when it reaches the end of register 160 this information is applied to code generation circuit 70 to insert the proper control information in the serial train of textual information.

However, should no interword be located in the smallest justification range, AND logic unit 182 will not produce an output, and the marker will be stepped all the way through the marker register 160 and produce an output pulse on line 214 which will pass through OR circuit 212 to clear the flip-flop 206 and terminate the application of shifting pulses to the marker register and at the same time will set the manual intervention flip-flop 216.

The setting of this flip-flop produces a level on line 218 which enables the hyphen push buttons 94 so that depression of one of those push buttons will produce an output signal from the push button circuitry 220. This level also conditions a gate 222 which then will pass a signal on line 224 from the interword push button 96, gate 226 (which is used for feedback control) and gate 228 which is connected to output 196 of AND logic unit 184.

Figure 8:
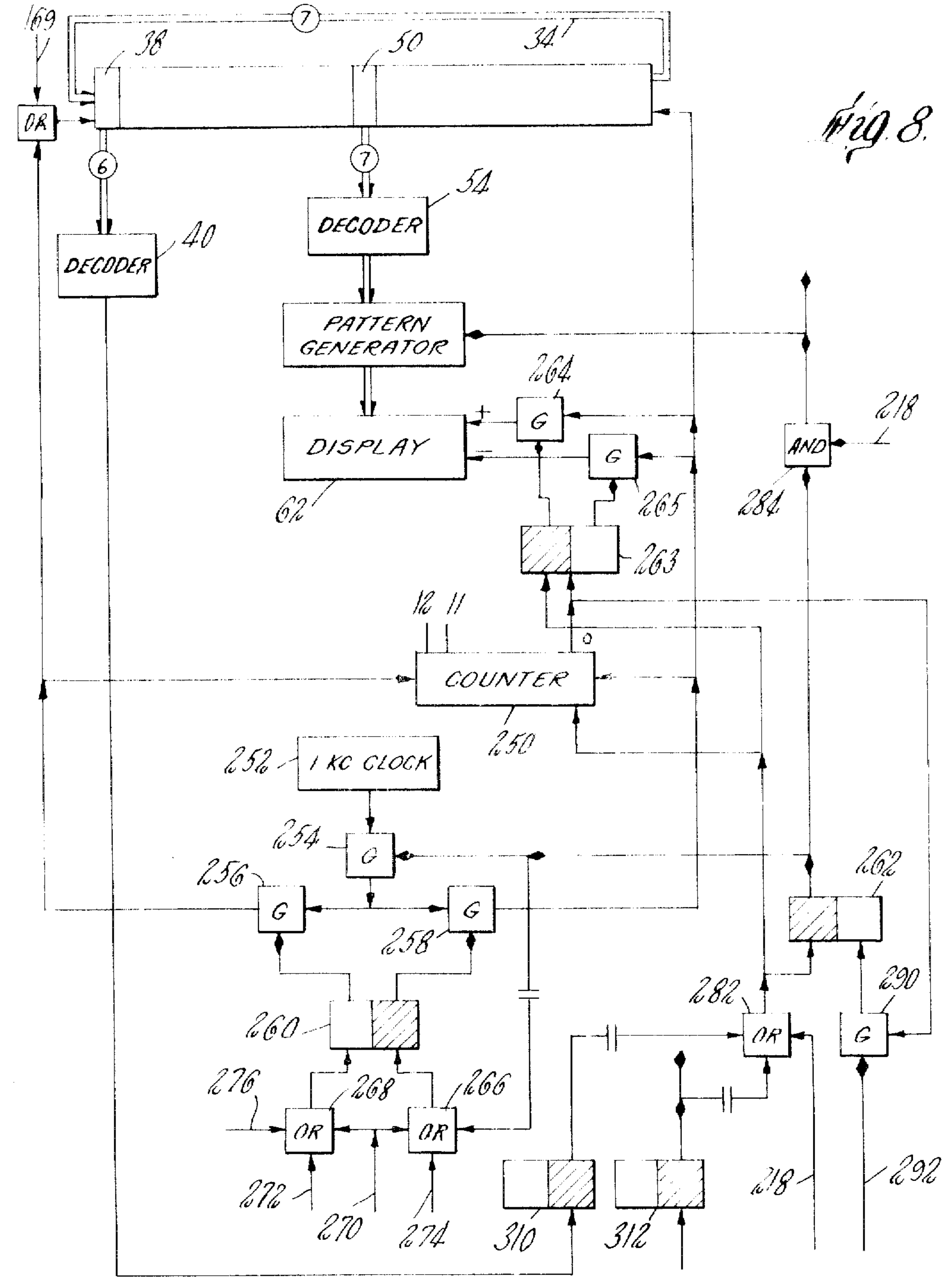
FIG. 8 is a logical block diagram of the display control apparatus employed for manual intervention purposes in the apparatus of FIG. 1.

This output level is also applied to the shift control unit 18 to interrupt the normal shifting operation of text signals by the read unit 10; to operate switch 28 to close the feedback loop 34 so that the contents of the text register may be preserved; and operates to energize the display control and shifting circuitry, details of which are shown in FIG. 8.

This display control and shifting circuitry includes a counter 250 which is reversible and may be stepped in the forward direction from zero to twelve and in the reverse direction from twelve to zero. The counter has outputs at the zero, eleven and twelve stages as indicated. This counter keeps track of deflection signals applied to the display 62 and associated pattern generator which may be of the type shown in the Gordon et al. Patent No. 2,920,312 and employing a 7 x 9 matrix whereby a sixty-three dot source is available for generating character configurations. The text register 20 and counter 250 are stepped in response to pulses from a one kilocycle clock 252 with the individual dots of the display being supplied from a one hundred kilocycle source so that all sixty-three possible dot locations are generated during each stepping cycle of the shift register. The shifting pulses are supplied from source 252 through gate 254 to a pair of gates 256, 258 which are alternately conditioned by the direction control flip-flop 260.

The application of shift pulses from source 252 is controlled by a display control flip-flop 262 which when set applies an output level to condition gate 254. The flip-flop setting pulse is also applied to clear counter 250 and to set sign control flip-flop 263. The setting transition of flip-flop 262 also applies a pulse through OR circuit 266 to set the direction control flip-flop 260, conditioning gate 258 to transmit pulses to step the text register 20 in the backward direction and correspondingly cause deflection of the character display electron beam in the opposite direction as controlled by sign control flip-flop 263 and the conditioned gate 264 or 265. At the same time the stepping pulses are applied to the counter 250 to maintain a record of the starting point of this stepping operation.

A second OR circuit 268, complementary to OR circuit 266, is provided, an output from which complements flip-flop 260 to apply shift pulses to the text register in the forward direction. The OR circuits have a common input from counter stage 12 (line 270), and similar inputs from interword code sensing circuitry (lines 272, 274). OR circuit 268 also has an input on line 276 from the stage eleven of the counter 250 (conditional on the existence of an interword signal in the next stage of the text register).

When the manual intervention flip-flop 216 (FIG. 5) is set, a pulse is transferred over line 280 through OR circuit 282 to set the shift control flip-flop 262 and to reset counter 250. The output level from the set shift control flip-flop initiates shifting and also conditions one input of AND circuit 282, the second input of which is conditioned by the level on line 218 from the set manual intervention flip-flop to enable the pattern generator and display 62. The contents of the text register are shifted backwards with the number of steps being recorded in the counter 250. As the contents of stage 50 of the text register 20 change, the characters stored therein are displayed on the screen 90 of the display unit 62. As soon as an interword character is sensed at stage 50 of the text register, a pulse is applied over lines 272, 274 through the OR circuits 266 and 268 to complement the direction control flip-flop 260 so that the stepping direction of the text register 24 is reversed. The stepping pulses are then applied to counter 250 to step it down toward zero. If no interword should be found within the contents of the text register, shifting will continue in the backword direction until the counter reaches the value twelve at which time an output pulse will be applied over line 270 to the OR circuits 266 and 268 to complement the direction control flip-flop 260 and similarly to transfer shifting from the backward direction to the forward direction.

When the counter reaches zero, an output pulse is generated which complements flip-flop 263 and samples gate 290. This gate is conditioned by level (line 292) supplied by the manual intervention flip-flop 216 when it is in the cleared state. If that flip-flop is not cleared, shifting continues with the counter 250 being stepped through zero and the count increased from zero to twelve or to the first detected interword, whichever occurs first. On either occurrence the directional control flip-flop 260 is again complemented and the directional shifting of the text register is reversed.

This shifting continues until the manual intervention flip-flop is cleared. After that time when the counter 250 is next stepped to zero, the output pulse is passed by the conditioned gate 290 to clear the shift control flip-flop 262. This operation removes the conditioning level from the display 62 and from the shifting control gate 254. It will be noted that through this control the contents of the text register 20 are restored to the position they occupied prior to the start of shifting. The switch 28 is returned to its initial position and the shift control unit 18 allows the tape reader to resume operation.

With reference once again to FIGS. 4 and 6, with the setting of the manual intervention flip-flop 216, gate 200 was conditioned, enabling an output from the logic unit 184. As indicated above, this logic unit operates in response to manual intervention signals by the operator monitoring the display. This manual intervention may take place through use of the hyphen push buttons 94, the interword push button 96, or either of those push buttons in combination with the bell mode push button 98.

Depression of a hyphen push button 94 when the push button circuitry 220 is enabled will apply an output pulse to the corresponding stage of the marker register to set that stage. That output signal will also be applied through the OR circuit 192 to the AND circuit 190 of the logic unit 184. As the depression of the push button has applied a signal over one of the lines 296 to set the corresponding stage in the marker register 160, the second input to the AND circuit 190 is also conditioned. If a stage of either range register 164 or 166 is set (indicating that the selected hyphenation point is within the pre-established ranges of standard interword values), the third input of the AND circuit 190 is conditioned and an output pulse signal is produced on line 196 which is passed by the conditioned gate 220 to clear the manual intervention flip-flop 216. With this operation, the flip-flop 216 produces an output level on line 292 (FIG. 8) so that the display will be turned off and normal shift operations resumed when the counter 250 next is set to zero.

However, should the selected stage be outside of the established justification ranges as determined by the contents of the registers 162 and 164, the level from the push button circuitry 220 which sets a stage in the marker register is also applied on line 298 to delay circuit 300, the conditioned gate 302 and OR circuit 204 to set the automatic search flip-flop 206. This operation conditions gate 208 to pass shift pulses from clock 210 to the marker register and shift out the marker that was placed in that register by operation of the push button circuitry 220. When the shift out of the marker produces a pulse on line 214, that pulse, as before, clears the automatic search flip-flop 206 through OR circuit 212. While the pulse is also applied to the manual intervention flip-flop 216, it has no affect as that flip-flop is remained in set condition. The fact that the display was not turned off in response to the depression of hyphen push button 94 signals the operator that the hyphenation point he selected is outside of the normal justification range. In this case he can either select another hyphenation point closer to the overset position, or depress the bell mode push button 98. If the latter course of action is chosen, a signal is stored for application to the code generation circuit 70 indicative of the fact that the end of line position was determined through the use of the bell mode logic, and an input is applied to the OR circuit 194 which over-rides the effect of the contents of the logic registers 164 and 166. When a hyphen push button is again depressed, that operation will condition the OR circuit 192 and the corresponding marker register stage that is set will condition the AND circuit 190 so that an output pulse will be produced on line 196. This output pulse will turn off the manual intervention flip-flop.

A second mode of operation that is possible is through the use of the interword push button 96. Depression of this push button applies a pulse on line 224 which is passed by the conditioned gate 222 and OR circuit 200 to set the first stage 202 of the marker register 160. The setting of this stage sets the automatic search flip-flop 206 which in turn conditions gate 208 to pass shift pulses to step the marker through the marker register. If a coincidence is detected between the marker and an indicator in the interword register 166 within the justification range specified by the contents of registers 162 and 164, AND circuit 190 will produce an output when the marker in register 160 reaches that point. This output is passed by the conditioned gate 228 through the OR circuit 212 to turn off the automatic search flip-flop 206 positioning the marker at that stage and also to turn off the manual intervention flip-flop 216 so that the display will be turned off when the counter 250 next is stepped to zero. It will be noted that the logic is effective to enable the interword push button 96 only when the display is operative.

Further, if desired the operator can over-ride the justification range logic contents of registers 164 and 166 by means of the bell mode push button and insert an end of line signal at an interword location through the depression of first the bell mode of the push button 98 and then the interword button 96.

In addition to display control, the shift control logic shown in FIG. 8 is also employed to delete characters on detection of a cancel word symbol and also in a recount operation of the contents of the text register 20 to provide a proper count for justification of the next line after the end of line codes have been inserted.

In the cancel word control, flip-flop 310 is set when a cancel code is detected at stage 38. The resulting signal from the cancel flip-flop 310 is applied as a pulse through OR circuit 282 to set the shift control flip-flop which conditions gate 254 and at the same time sets the directional control flip-flop through OR circuit 266 to initiate shifting of the contents of the text register 20 in the backward direction. The counter 250 is stepped at this time, but the display is not turned on and switch 28 is not actuated as AND circuit 284 is not fully conditioned. Stepping continues until the counter 250 reaches twelve or an interword is detected at stage 38. On either occurrence, a pulse is applied through OR 268 to complement the flip-flop 260 and step the counter 250 in the opposite direction. The contents of text register 20 are shifted forward at the one kilocycle rate back to their initial position at which point the zero output from the counter is passed through gate 290 (which is conditioned as this is not a manual intervention situation) to clear flip-flop 262 and terminate shift pulse transmission.

The recount operation is necessary to include in the accumulated count of the next line those contents of the text register 20 between stage 50 and the last stage at the time the end of line codes are generated. As indicated above, that occurs when the marker in the register 160 is stepped out. In response thereto, the recount flip-flop 312 is set producing an output level which actuates switch 28 to connect feedback link 34 in circuit, and an output pulse which is applied through OR circuit 282 to reset counter 250 and to set the shift control flip-flop 262. In the same manner as before with the setting of this flip-flop pulses are generated at a one kilocycle rate to shift the contents of the text register back twelve stages (or eleven stages if the twelfth character is an interword). The link 34 is opened after the eleventh forward shift in this latter case to delete the interword. When a pulse signal is applied to either line 270 or 276 the direction control flip-flop is complemented to apply stepping pulses in the forward direction and the justification logic 58 is also enabled simultaneously to accumulate the weight count of these twelve characters at the high speed shifting rate. (The interword inputs 272, 274 to the directional control flip-flop 270 are disabled during this operation as the display circuit is inactive so that an interword does not cause the directional control flip-flop 260 to be complemented prematurely.) As the contents of the shift register are shifted forward with the corresponding count being reduced in the counter 250, the justification logic stores the weights of the characters in these twelve stages. When the counter 250 reaches zero, the output pulse is passed by gate 290 to clear the shift control flip-flop, terminating the shifting. At this time the circuitry is ready for further shifting operations from the read unit 10 and all the control flip-flops in the justification logic, the shift control, etc., are reset in anticipation of the next cycle of operation.

In the above described embodiment, the end of line code generated by the justification logic at the end of each line includes information as to the size of the interword spacers to be used by the line casting machine. Where a longer text register is employed having a capacity of a complete line, for example, equal or graded interword values may be inserted under control of justification logic while the entire line is in the text register. Such a register also enables tabular text arrangements to be generated. In another modification, rather than shifting the contents of the text register relative to the decoder, the text register stages are addressable so that the contents of specific stages may be read out for display control purposes, for example, without shifting those contents. In such an arrangement, the reversible counter display control may be eliminated.

While a preferred embodiment of the invention and modifications thereof have been shown and described, additional modifications thereof will be obvious to those skilled in the art. Therefore, it is not intended that the invention be limited to the disclosed embodiment or to details thereof, and departures may be made therefrom within the spirit and scope of the invention as defined in the claims.

What is claimed is:

1. Apparatus for generating line casting machine control signals, comprising means to sense signals representing text data comprising characters and interwords, means to accumulate a line length indication from said text signals as a function of a predetermined interword spacing, means responsive to said accumulating means to generate an overset point indication as a line length limit for said predetermined interword spacing, means responsive to said overset indication to display the location of said overset point relative to text characters, and manually operable means to enter an end of line code in said text data as a function of said display for control of a line casting machine.

2. Apparatus for generating line casting machine control signals, comprising means to sense signals representing text data comprising characters and interwords, means to accumulate a line length indication from said text signals as a function of a predetermined interword spacing and an overset point indication as a line length limit for character inclusion in the line where said predetermined interword spacing is employed, means to generate a display of characters from said text signals including an indication of the location of said overset point relative to said displayed characters, and manually operable means to enter an end of line code in said text data as a function of said display for control of a line casting machine.

3. A serial data translation system for processing a serial train of data items comprising data item signal providing means, a shift register coupled to said data item signal providing means having a plurality of stages for storing signals representing a corresponding plurality of data items, means to shift said data item signals through said shift register, decoder means coupled to said shift register for sensing signals representative of data items stored in said shift register, accumulator means coupled to said decoder responsive to signals from a plurality of data items, data item display means coupled to said decoder, manual intervention controls disposed in correlated relation to said display means, means responsive to said accumulator means to generate signals representative of a predetermined data item in response to the satisfaction of a predetermined criterion, means operative in the absence of said predetermined criterion to actuate said display and enable said manual intervention controls for generating signals representative of said predetermined data item, and means responsive to the generation of said predetermined data item signals to insert said generated signals in said serial train.

4. A serial data translation system for processing a serial train of data items comprising data item signal providing means, a shift register coupled to said data item signal providing means having a plurality of stages for storing signals representing a corresponding plurality of data items, means to shift said data item signals through said shift register, decoder means coupled to said shift register for sensing signals representative of data items stored in said shift register, data item display means coupled to said decoder, a counter, and control means to apply shift signals simultaneously to said counter and said shift register for controlling the display of a plurality of characters as represented by signals stored in said shift register.

5. A serial data translation system comprising data item signal providing means, a main shift register coupled to said data item signal providing means having a plurality of stages for storing signals representing a train of data items, means to shift data item signals through said main shift register in a forward direction, decoder means coupled to a stage of said shift register for sensing signals representative of a data item stored in that stage, weighting means coupled to said decoder for according a weight as a function of the item in said stage, storage means coupled to said weighting means for storing a cumulative weight of data items as sensed by said decoder, auxiliary shift register means, means to place information in said auxiliary shift register means as a function of the contents of said main shift register, and means to shift said main and auxiliary shift register means in synchronism to generate signals representative of a data item for insertion in said data item train as a function of the contents of said auxiliary shift register means.

6. A serial data translation system comprising data item signal providing means, a main shift register coupled to said data item signal providing means having a plurality of stages for storing signals representing a train of data items, means to shift data item signals through said main shift register in a forward direction at a first rate, decoder means coupled to a first stage of said shift register for sensing signals representative of a data item stored in that stage, weighting means coupled to said decoder for according a weight as a function of the item in said stage, storage means coupled to said weighting means for storing a cumulative weight of data items as sensed by said decoder, means to generate and enter signals representative of a data item in said signal train as a function of the contents of said storage means, means coupled to a second stage of said shift register operable in response to the detection of a predetermined data item code in said second stage to shift signals representative of data items stored in said shift register in the backward direction at a more rapid shift rate than said first rate to delete signals representative of data items from said train, and means responsive to the detection of a second predetermined data item code in said second stage to terminate said more rapid shift rate.

7. The system as claimed in claim 6 wherein said signal generating and entering means includes auxiliary shift register means, means to place information in said auxiliary shift register means as a function of the contents of said main shift register, and means to shift said main and auxiliary shift register means in synchronism to generate said signals representative of a data item for insertion in said signal train as a function of the contents of said auxiliary shift register means.

8. The system as claimed in claim 7 and further including cathode ray display means coupled to said decoder, a counter, means to sense the signals representative of data items in said main shift register serially, means to step said counter in synchronism with said serial item sensing to control the display of data items, and means to generate signals representative of a data item for insertion into said signal train as a function of the items displayed by said display means.

9. The system as claimed in claim 8 wherein said counter is reversible, said signal sensing means includes means to deflect the beam of said cathode ray display means in a series of steps, and means to reverse the direction of beam deflection and counter stepping in response to the sensing for display of signals representative of a predetermined data item.

10. The system as claimed in claim 9 and further including means to reverse the direction of counter stepping in response to a predetermined counter output.

11. The system as claimed in claim 9 and further including means to terminate the energization of said display means in response to a predetermined counter output.

12. A data generation system comprising main shift register means having a plurality of stages for storing signals representative of a train of data items, auxiliary shift register means, means to place information in said auxiliary shift register means as a function of the contents of said main shift register, and means to shift said main and auxiliary shift register means in synchronism to generate signals representative of a data item for insertion in said train of data items as a function of the contents of said auxiliary shift register means.

13. A data generation system comprising main shift register means having a plurality of stages for storing signals representative of a train of data items, auxiliary shift register means, said auxiliary shift register means including a marker register, means to place information in said auxiliary shift register means as a function of the contents of said main shift register, means to shift a marker through said marker register at a higher rate of speed than the normal shift rate, means to terminate said marker register shift as a function of the contents of said auxiliary register means, and means to shift said main and auxiliary shift register means in synchronism to generate signals representative of a data item for insertion in said train of data items as a function of the contents of said auxiliary shift register means.

14. A data display system comprising means for displaying a plurality of data items, storage means for storing signals representing a plurality of data items, a counter, means to sense the signals representative of data items in said storage means serially, and means to step said counter in synchronism with said serial item sensing to control the display of data items.

15. A data display system comprising cathode ray means including beam generation means for displaying a plurality of data items, storage means for storing signals representing a plurality of data items, a reversible counter, means to sense the signals representative of data items in said storage means serially and to deflect said cathode ray beam in a corresponding series of steps to display the sensed data item, means to step said counter in synchronism with said beam deflection steps, means responsive to a predetermined counter output to reverse the direction of counter and beam deflection steps, and means to terminate said beam generation in response to a second predetermined counter output.

16. Apparatus for generating typographical control signals comprising means to store signals representing text data comprising characters and interwords, means to shift text signals through said storage means at a first rate to accumulate a line length indication from said text signals as a function of a predetermined interword spacing, means to generate an end of line code and enter said end of line code in said text data as a function of said accumulated line length indication, and means operative on generation of said end of line code to shift text signals in said storage means backwards and then forward at a higher shift rate than said first shift rate.

17. Coded text data translating apparatus comprising serial data storage means for storing signals representative of characters, a character decoder coupled to at least one stage of said serial data storage means, character weighting circuitry coupled to said decoder for providing a weight signal for each sensed character in said serial train and a plurality of different weights for a predetermined character, weight accumulator means, character display means, means responsive to a predetermined output of said accumulator means to generate signals representative of a character automatically in response to the sensing of a predetermined criterion and to enable said display means for display of characters in said storage means if said predetermined criterion is not sensed, and manual means responsive to the enabling of said display for generating signals representative of a character as a function of the display.

18. The apparatus as claimed in claim 17 wherein said display means includes a counter, means to sense the signals representative of data items in said serial data storage means serially, means to step said counter in synchronism with said serial character sensing to control the display of characters, and means to generate signals representative of a character for insertion into said signal train as a function of the characters displayed by said display means.

19. The apparatus as claimed in claim 18 wherein said counter is reversible, said signal sensing means includes means to deflect said display means in a series of steps, and means to reverse the direction of display deflection and counter stepping in response to the sensing for display of signals representative of a predetermined character.

20. The system as claimed in claim 19 and further including means to reverse the direction of counter stepping in response to a predetermined counter output.

21. The system as claimed in claim 20 and further including means to terminate the energization of said display means in response to a predetermined counter output.

22. The apparatus as claimed in claim 17 wherein said serial data storage means is a main shift register and said weight accumulator means includes auxiliary shift register means, means to place information in said auxiliary shift register means as a function of the contents of said main shift register, and means to shift said main and auxiliary shift register means in synchronism to generate signals representative of a data item for insertion in said character signal train as a function of the contents of said auxiliary shift register means.

23. Apparatus for generating typographical control signals comprising means for providing signals representing a series of text data items, a main shift register coupled to said data signal providing means having a plurality of stages for storing signals representing a corresponding plurality of data items, means to shift said data item signals through said shift register, decoder means coupled to said shift register for sensing signals representative of data items stored in said shift register, accumulator means coupled to said decoder responsive to signals from a plurality of data items, said accumulator means including auxiliary shift register means, data item display means coupled to said decoder, manual intervention controls disposed in correlated relation to said display means, means responsive to said accumulator means to generate signals representative of an end of line code in response to the satisfaction of a predetermined criterion, means operative in the absence of said predetermined criterion to actuate said display and enable said manual intervention controls for generating signals representative of said end of line code, and means responsive to the generation of said end of line code signals to shift said main shift register and said auxiliary shift register means in synchronism to insert signals representative of said end of line code in said serial train.

24. The apparatus as claimed in claim 23 wherein said display means includes a reversible counter for synchronizing the display with the contents of said main shift register.

25. The apparatus as claimed in claim 24 and further including means operative on insertion of said end of line code signals in said serial train to shift text signals in said main shift register backwards and then forward at a higher shift rate than the normal shift rate under the control of said counter.

No references cited.

ROBERT C. BAILEY, *Primary Examiner.*

R. B. ZACHE, *Assistant Examiner.*